(12) United States Patent
Mae et al.

(10) Patent No.: US 12,705,902 B2
(45) Date of Patent: Aug. 11, 2026

(54) LOADED ATTITUDE STATE DETECTING DEVICE

(71) Applicants: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP)

(72) Inventors: Shinichi Mae, Tsukuba (JP); Yukikazu Koide, Tsukuba (JP); Hironobu Okamoto, Tsukuba (JP); Hirokatsu Kataoka, Tsukuba (JP)

(73) Assignees: KABUSHIKI KAISHA TOYOTA JIDOSHOKKI, Kariya (JP); NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 336 days.

(21) Appl. No.: 18/519,870

(22) Filed: Nov. 27, 2023

(65) Prior Publication Data

US 2024/0177493 A1 May 30, 2024

(30) Foreign Application Priority Data

Nov. 29, 2022 (JP) ................................ 2022-190302

(51) Int. Cl.
*G06V 20/56* (2022.01)
*G06T 7/00* (2017.01)
(Continued)

(52) U.S. Cl.
CPC ........... *G06V 20/56* (2022.01); *G06T 7/0002* (2013.01); *G06V 10/77* (2022.01); *G06V 20/60* (2022.01);
(Continued)

(58) Field of Classification Search
CPC ......... G06T 7/0002; G06T 7/70; G06V 20/60; G06V 20/70
See application file for complete search history.

(56) References Cited

U.S. PATENT DOCUMENTS

2020/0109038 A1 4/2020 Nagasawa
2021/0078843 A1* 3/2021 Hattori ................. B66F 9/0755
(Continued)

FOREIGN PATENT DOCUMENTS

CN 110517314 A * 11/2019 ............... G06T 7/70
DE 102020123381 A1 3/2021
(Continued)

OTHER PUBLICATIONS

Hirokatsu Kataoka, Asato Matsumoto, Ryosuke Yamada, Yutaka Satoh, Eisuke Yamagata, Nakamasa Inoue; Proceedings of the IEEE/CVF International Conference on Computer Vision (ICCV) Workshops, 2021, pp. 4098-4105 (Year: 2021).*
(Continued)

*Primary Examiner* — Bobbak Safaipour
*Assistant Examiner* — Ashley Hytrek
(74) *Attorney, Agent, or Firm* — Sughrue Mion, PLLC

(57) ABSTRACT

The loaded attitude state detecting device 10 includes a camera 11 that acquires loaded attitude image data D of pallets 4 and cargos 5, an area extracting unit 15 that extracts areas of the pallets 4 and the cargos 5 in the loaded attitude image data D, and a loaded attitude abnormality determining unit 16 that determines whether or not the detection target pallet 4 interferes with the pallet 4 neighboring in the lateral direction based on the areas of the pallets 4 in the loaded attitude image data D, and determines whether or not the detection target cargo 5 interferes with the cargo 5 or the
(Continued)

pallet 4 neighboring in the lateral direction based on the areas of the pallets 4 and the cargos 5 in the loaded attitude image data D.

6 Claims, 10 Drawing Sheets

(51) Int. Cl.
*G06V 10/77* (2022.01)
*G06V 20/60* (2022.01)
*G06V 20/70* (2022.01)

(52) U.S. Cl.
CPC .... *G06V 20/70* (2022.01); *G06T 2207/20081* (2013.01); *G06T 2207/30252* (2013.01)

(56) References Cited

U.S. PATENT DOCUMENTS

| | | | | |
|---|---|---|---|---|
| 2021/0141368 | A1* | 5/2021 | Holwell | G05B 19/41895 |
| 2022/0066464 | A1* | 3/2022 | Takao | G01S 17/89 |
| 2022/0363528 | A1 | 11/2022 | Okamoto et al. | |
| 2023/0348247 | A1* | 11/2023 | Takao | G05D 1/0225 |
| 2024/0013422 | A1 | 1/2024 | Hatsuda et al. | |

FOREIGN PATENT DOCUMENTS

| | | | | |
|---|---|---|---|---|
| JP | 2008156122 | A | | 7/2008 |
| JP | 2018020881 | A | | 2/2018 |
| JP | 2018199560 | A | | 12/2018 |
| JP | 2021-062964 | A | | 4/2021 |
| JP | 2021-066576 | A | | 4/2021 |
| JP | 2021149177 | A | * | 9/2021 |
| JP | 2022025246 | A | | 2/2022 |
| WO | 2022/209667 | A1 | | 10/2022 |

OTHER PUBLICATIONS

Kataoka, Hirokatsu, Kazushige Okayasu, Asato Matsumoto, Eisuke Yamagata, Ryosuke Yamada, Nakamasa Inoue, Akio Nakamura, and Yutaka Satoh. "Pre-training without natural images." In Proceedings of the Asian Conference on Computer Vision. 2020. (Year: 2020).*

Hirokatsu Kataoka, Asato Matsumoto, Ryosuke Yamada, Yutaka Satoh, Eisuke Yamagata, Nakamasa Inoue. "Formula-Driven Supervised Learning with Recursive Tile Patterns." In Proceedings of the IEEE/CVF ICCV Workshops, 2021, pp. 4098-4105 (Year: 2021).*

Ryosuke Yamada et al., "Multi-view Fractal DataBase: Generation of Multi-view Image Datasets Based on Fractal Geometry", Image Lab, 2022 (16 pages total, including translation).

* cited by examiner 2
1
10
11
CAMERA
14
CONTROLLER
15
AREA EXTRACTING UNIT
16
LOADED ATTITUDE ABNORMALITY DETERMINING UNIT
17
LOADING/ UNLOADING CONTROLLING UNIT
12
DRIVING UNIT
13
WARNING UNIT 15
21
LEARNED DATA
20
LOADED ATTITUDE RECOGNITION MODEL
22
FEATURE AMOUNT EXTRACTING UNIT
23
AREA RECOGNIZING UNIT
LOADED ATTITUDE IMAGE DATA
AREA EXTRACTION RESULT 20
LOADED ATTITUDE RECOGNITION MODEL
5
29
4
22
FEATURE AMOUNT EXTRACTING UNIT
23
AREA RECOGNIZING UNIT
21
LEARNED DATA
26
PRE-LEARNING DATA

D
5
5
4
4
5
5
4
4

D
Sa(S)
5
Sb(S)
5
4
4
5
5
4
4

D
Sa(S)
5
Sb(S)
5
4
4A(4)
5
5
4
4A(4)

D
5
5
4
4
5
5
4
4

D
Sa(S)
5
5
Sb(S)
4
4
5
5
4
4

D
L1
L2
L1
5
5
Sb(S)
4
4
5
5
4
4
L3
R

D
5
W
5
4
4
5
5
4
4

LOADED ATTITUDE STATE DETECTING DEVICE

TECHNICAL FIELD

The present disclosure relates to a loaded attitude state detecting device.

BACKGROUND

Japanese Unexamined Patent Publication No. 2021-62964 describes a technique that an autonomously traveling forklift including a sensor and a camera mounted thereon unloads goods loaded on a truck, and loads goods on an autonomously traveling automated guided vehicle.

SUMMARY

At an actual distribution site, when loading states (loaded attitude states) of pallets and cargos are abnormal, unloading may not be able to be performed by stationary loading/unloading control. Hence, it is necessary to detect whether or not the loaded attitude states of the pallets and the cargos are abnormal, and perform appropriate handling matching the loaded attitude states when the loaded attitude states are abnormal.

An object of the present disclosure is to provide a loaded attitude state detecting device that can detect whether or not loaded attitude states of pallets and cargos are abnormal.

(1) One aspect of the present disclosure is a loaded attitude state detecting device that is configured to detect loaded attitude states of a plurality of pallets and cargos when a forklift performs loading/unloading in a state where the cargos are placed on the pallets aligned and disposed in a lateral direction seen from the forklift, and that includes: a detecting unit configured to acquire loaded attitude detection data of the pallets and the cargos by detecting loaded attitudes of the pallets and the cargos; an area extracting unit configured to extract areas of the pallets and the cargos in the loaded attitude detection data acquired by the detecting unit; and a loaded attitude abnormality determining unit configured to determine whether or not a detection target pallet interferes with a pallet neighboring in the lateral direction based on the areas of the pallets in the loaded attitude detection data extracted by the area extracting unit, and determines whether or not a detection target cargo interferes with a cargo or a pallet neighboring in the lateral direction based on the areas of the pallets and the cargos in the loaded attitude detection data.

This loaded attitude state detecting device extracts the areas of the pallets and the cargos in the loaded attitude detection data acquired by detecting the loaded attitudes of the pallets and the cargos. Furthermore, whether or not the detection target pallet interferes with the pallet neighboring in the lateral direction is determined based on the areas of the pallets in the loaded attitude detection data. Furthermore, whether or not the detection target cargo interferes with the cargo or the pallet neighboring in the lateral direction is determined based on the areas of the pallets and the cargos in the loaded attitude detection data. When it is determined that the detection target pallet interferes with the pallet neighboring in the lateral direction, it is detected that the loaded attitude states of the pallets and the cargos are abnormal. Even when it is determined that the detection target cargo interferes with the cargo or the pallet neighboring in the lateral direction, too, it is detected that the loaded attitude states of the pallets and the cargo are abnormal. Consequently, it is possible to detect whether or not the loaded attitude states of the pallets and the cargos are abnormal.

(2) In above (1), the loaded attitude abnormality determining unit may create, along the lateral direction, a plurality of sets of cargo sets indicating areas including the pallets and the cargos that are in contact with each other in an upper-lower direction in the loaded attitude detection data, determine whether or not a pallet of a detection target cargo set among the plurality of sets of cargo sets interferes with a pallet of a cargo set neighboring in the lateral direction, and determine whether or not a cargo of the detection target cargo set interferes with a cargo or a pallet of a cargo set neighboring in the lateral direction.

According to this configuration, whether or not the detection target pallets and cargos cause interferences is determined per cargo set indicating the area including the pallets and the cargos in contact with each other in the upper-lower direction in the loaded attitude detection data. The cargo set corresponds to a unit of loading/unloading collectively performed by a forklift. Consequently, it is possible to efficiently determine whether or not the detection target pallets and cargos cause interferences in the units of loading/unloading.

(3) In above (2), when the pallet of the detection target cargo set contacts the pallet of the cargo set neighboring in the lateral direction, and an attitude angle of the pallet of the detection target cargo set is a predetermined threshold or more, the loaded attitude abnormality determining unit may determine that the pallet of the detection target cargo set interferes with a pallet of a cargo set neighboring in the lateral direction.

According to this configuration, it is possible to easily determine whether or not the pallet of the detection target cargo set interferes with the pallet of the cargo set neighboring in the lateral direction. Furthermore, even when the pallet of the detection target cargo set is in contact with the pallet of the cargo set neighboring in the lateral direction, and when the attitude angle of the pallet of the detection target cargo set is smaller than the threshold, it is possible to load and unload the cargo set neighboring in the lateral direction of the detection target cargo set without any trouble. Consequently, it is possible to prevent the loading/unloading work from being wastefully stopped.

(4) In above (2) or (3), when the detection target cargo set overlaps an inner area of two virtual lines formed by extending, in the upper-lower direction, both left and right ends of the pallet of the cargo set neighboring in the lateral direction, the loaded attitude abnormality determining unit may determine that a cargo of the detection target cargo set interferes with a cargo or a pallet of a cargo set neighboring in the lateral direction.

According to this configuration, it is possible to easily determine whether or not the cargo of the detection target cargo set interferes with the cargo or the pallet of the cargo set neighboring in the lateral direction.

(5) In any one of above (1) to (4), the detecting unit may acquire the loaded attitude image data of the pallets and the cargos as the loaded attitude detection data by imaging the loaded attitude states of the pallets and the cargos, and the area extracting unit may extract the areas of the pallets and the cargos in the loaded attitude image data in units of pixels of the loaded attitude image data.

According to this configuration, it is possible to accurately extract the areas of the pallets and the cargos in the loaded attitude detection data by using the loaded attitude image data acquired by imaging the loaded attitudes of the pallets and the cargos.

(6) In above (5), the area extracting unit may extract the areas of the pallets and the cargos in the loaded attitude image data by using learned data including loaded attitude images of a plurality of types of pallets and cargos and pixel information of the plurality of types of the pallets and the cargos.

According to this configuration, it is possible to accurately extract the areas of the pallets and the cargos in the loaded attitude image data by using the learned data including the loaded attitude image and the pixel information.

(7) In above (6), the learned data may be generated by performing transfer learning on data obtained by annotating the pixel information of the pallets and the cargos to the loaded attitude images of the pallets and the cargos using pre-learning data obtained by pre-learning a formula driven database.

According to this configuration, by using the pre-learning data obtained by pre-learning the formula driven database, it is possible to accurately extract the areas of the pallets and the cargos in the loaded attitude image data while reducing the number of loaded attitude images obtained by imaging the loaded attitudes of the pallets and the cargos.

DETAILED DESCRIPTION

Figure 1:
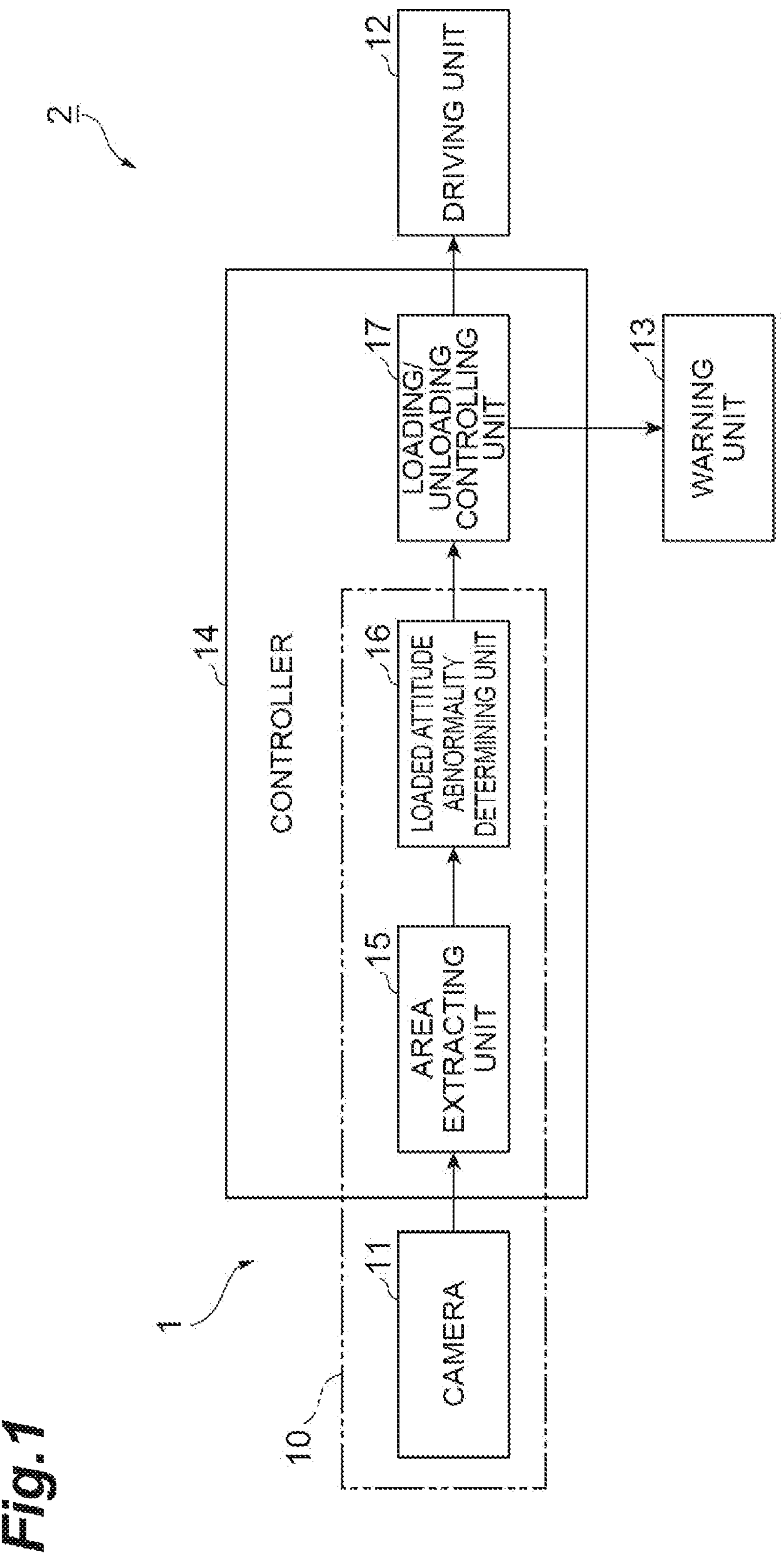
FIG. 1 is a block diagram illustrating a configuration of a loading/unloading controlling device including a loaded attitude state detecting device according to an embodiment of the present disclosure.

Hereinafter, an embodiment of the present disclosure will be described in detail with reference to the drawings. In the drawings, the same or equivalent components will be assigned the same reference numerals, and redundant description will be omitted.

FIG. 1 is a block diagram illustrating a configuration of a loading/unloading controlling device including a loaded attitude state detecting device according to an embodiment of the present disclosure. In FIG. 1, a loading/unloading controlling device 1 is mounted on a forklift 2. The loading/unloading controlling device 1 is a device that performs loading/unloading control when the forklift 2 automatically performs loading/unloading.

Figure 2:
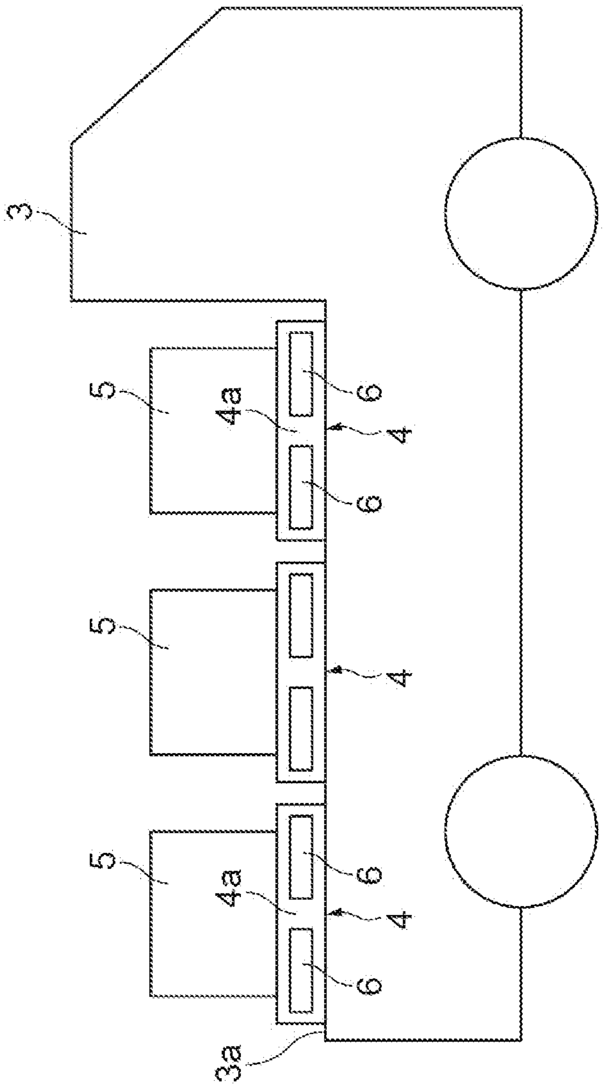
FIG. 2 is a view illustrating a state where pallets with cargos placed thereon are loaded on a bed of a truck.

Here, as illustrated in FIG. 2, the loading/unloading controlling device 1 controls the forklift 2 at the time when forks (not illustrated) of the forklift 2 hold, that is, unloads a pallet 4 loaded on a bed 3*a* of a truck 3. A cargo 5 is placed on the pallet 4. The pallet 4 is provided with two fork holes 6 into which the forks of the forklift 2 are inserted. The fork holes 6 extend from a front surface 4*a* to a rear side of the pallet 4.

The plurality of pallets 4 are loaded on the bed 3*a* of the truck 3 along a front-rear direction of the truck 3. The pallets 4 are disposed such that the front surfaces 4*a* face sideward of the truck 3. Hence, the forklift 2 performs unloading on the side of the truck 3. At this time, the plurality of pallets 4 are aligned and disposed in a lateral direction (left-right direction) seen from the forklift 2. Here, the forks of the forklift 2 hold together the pallets 4 of two upper and lower stages on which the cargos 5 are placed (see FIGS. 8A, 8B, 8C and 10A, 10B, 10C, 10D). At this time, the forks are inserted into the fork holes 6 of the pallet 4 of the lower stage.

As illustrated in FIG. 2, when loaded attitude states of the pallets 4 and the cargos 5 are normal, the forklift 2 can smoothly perform unloading. The loaded attitude refers to how the pallet 4 and the cargo 5 are placed.

Figure 3A:
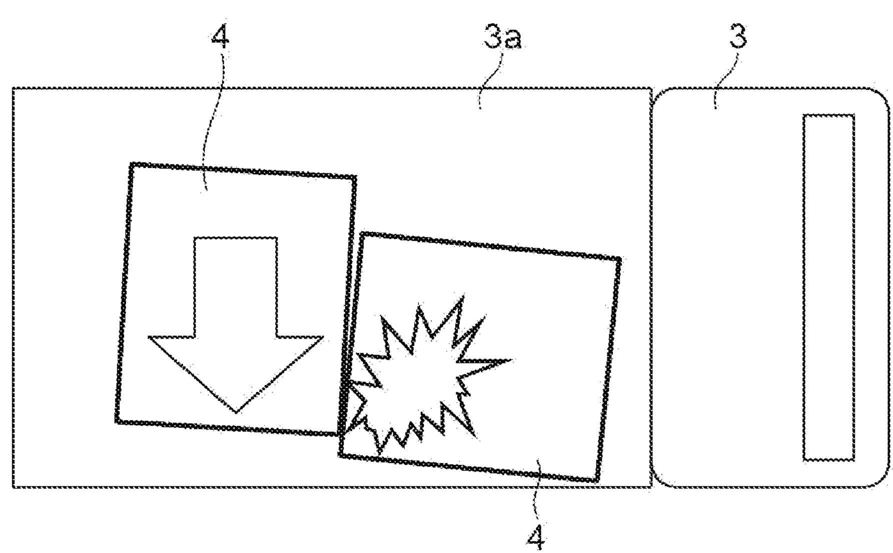
FIG. 3A is a view illustrating a state where a pallet interferes with a neighboring pallet.
Figure 3B:
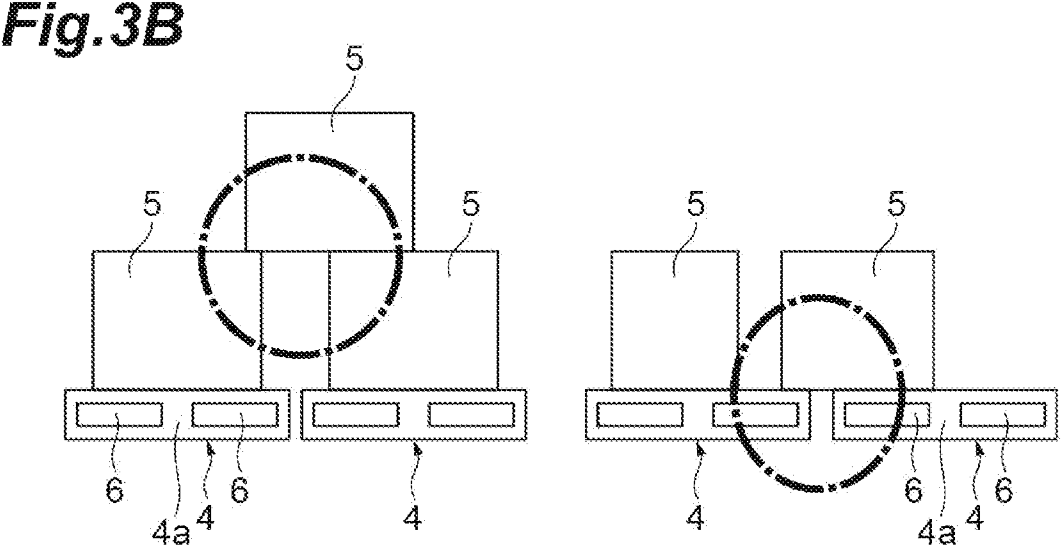
FIG. 3B is a view illustrating a state where a cargo interferes with a neighboring cargo or a pallet.

However, as illustrated in FIGS. 3A, 3B, when the loaded attitude states of the pallets 4 and the cargos 5 are abnormal, the forklift 2 may not be able to perform unloading. When, for example, the pallets 4 neighboring in the lateral direction interfere with each other in a width direction of the truck 3 (a direction to draw the pallets 4 from the bed 3*a* to the side of the truck 3) as illustrated in FIG. 3A, cargo collapse may occur when unloading is performed. Furthermore, when the cargo 5 placed on the pallet 4 interferes with the cargo 5 placed on the pallet 4 neighboring in the lateral direction, or the cargo 5 placed on the pallet 4 interferes with the pallet 4 neighboring in the lateral direction as illustrated in FIG. 3B, the cargo collapse may also occur when unloading is performed.

To solve such a problem, the loading/unloading controlling device 1 detects whether or not the loaded attitude states of the pallets 4 and the cargos 5 are abnormal, and performs appropriate control matching the loaded attitude states when the loaded attitude states of the pallets 4 and the cargos 5 are abnormal.

The loading/unloading controlling device 1 includes a loaded attitude state detecting device 10 that detects the loaded attitude states of the pallets 4 and the cargos 5. The loaded attitude state detecting device 10 is a device that detects whether the loaded attitude states of the pallets 4 and the cargos 5 are normal or abnormal when the forklift 2 performs loading and unloading in a state where the cargos 5 are placed on the plurality of pallets 4 aligned and disposed in the lateral direction seen from the forklift 2.

The loading/unloading controlling device 1 including the loaded attitude state detecting device 10 includes a camera 11, a driving unit 12, a warning unit 13, and a controller 14.

The camera 11 is an imaging unit that images the front of the forklift 2. The camera 11 acquires loaded attitude image data of the pallets 4 and the cargos 5 by imaging the loaded attitudes of the pallets 4 and the cargos 5. The camera 11 configures a detecting unit that acquires the loaded attitude image data that is the loaded attitude detection data of the pallets 4 and the cargos 5 by detecting the loaded attitudes of the pallets 4 and the cargos 5.

Although not particularly illustrated, the driving unit 12 includes a traveling motor that causes the forklift 2 to travel, a steering motor that steers the forklift 2, a lift cylinder that raises and lowers the forks (not illustrated) of the forklift 2, a tilt cylinder that tilts the forks, and the like. The warning unit 13 issues a warning, for example, by generating a warning sound.

The controller 14 includes a CPU, a RAM, a ROM, an input/output interface, and the like. The controller 14 includes an area extracting unit 15, a loaded attitude abnormality determining unit 16, and a loading/unloading controlling unit 17. The camera 11, the area extracting unit 15, and the loaded attitude abnormality determining unit 16 configure the loaded attitude state detecting device 10 according to the present embodiment.

The area extracting unit 15 extracts areas of the pallets 4 and the cargos 5 in the loaded attitude image data acquired by the camera 11. The area extracting unit 15 extracts the areas of the pallets 4 and the cargos 5 in the loaded attitude image data in units of pixels of the loaded attitude image data.

Figure 4:
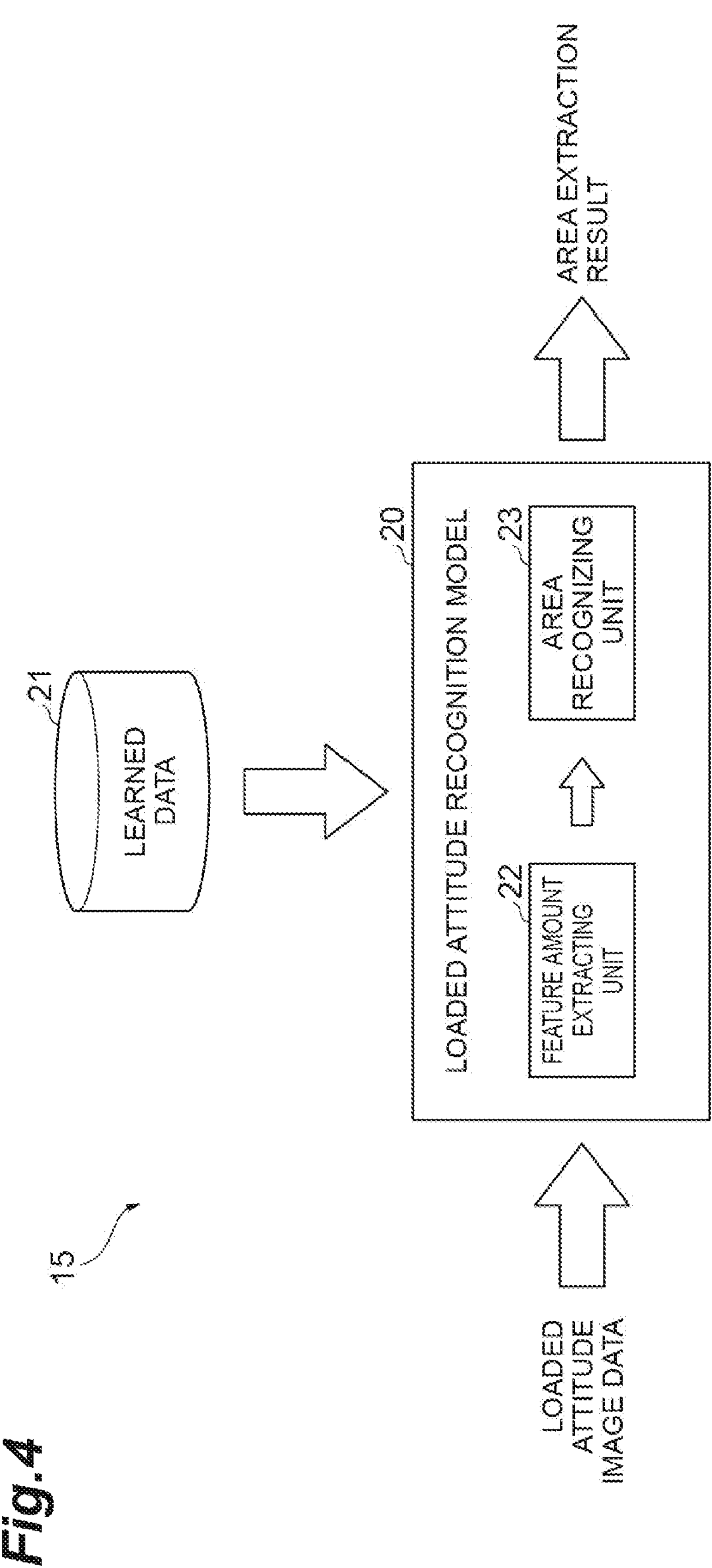
FIG. 4 is a block diagram illustrating a function of an area extracting unit illustrated in FIG. 1.

More specifically, as illustrated in FIG. 4, the area extracting unit 15 includes functions including a loaded attitude recognition model 20 and learned data 21. The area extracting unit 15 extracts the areas of the pallets 4 and the cargos 5 in the loaded attitude image data acquired by the camera 11 by causing the loaded attitude recognition model 20 to read the learned data 21.

The loaded attitude recognition model 20 is an instance segmentation model constructed using deep learning. Instance segmentation is a technique of estimating an individual object position in units of pixels, and performs learning by labeling a target object area in detail and estimates an object position. The loaded attitude recognition model 20 is constructed using data obtained by annotating the areas of the pallets 4 and the cargos 5 to images obtained by photographing the pallets 4 and the cargos 5.

The loaded attitude recognition model 20 includes a feature amount extracting unit 22 that extracts a feature amount of the loaded attitude image acquired by the camera 11 using the learned data 21, and an area recognizing unit 23 that recognizes the areas of the pallets 4 and the cargos 5 in the loaded attitude image data using the learned data 21 and the feature amount of the loaded attitude image.

The learned data 21 includes two types of data such as loaded attitude images obtained by photographing the pallets 4 and the cargos 5, and data files including information of the pallets 4 and the cargos 5 in the loaded attitude images. The information on the pallets 4 and the cargos 5 in the loaded attitude image includes pixel numbers of the loaded attitude image. The areas of the pallets 4 and the cargos 5 in the loaded attitude image are indicated by the pixel numbers of the loaded attitude image.

In a case where, for example, the number of types of the cargo 5 is two types of a cardboard box and a component box, and the number of types of the pallet 4 is two types of a plastic pallet and a post pallet, the learned data 21 obtained by assigning labels of the areas of the pallets 4 and the cargos 5 to the four types of loaded attitude images in total obtained by photographing the pallets 4 and the cargos 5 is prepared.

Figures 5A, 5B:
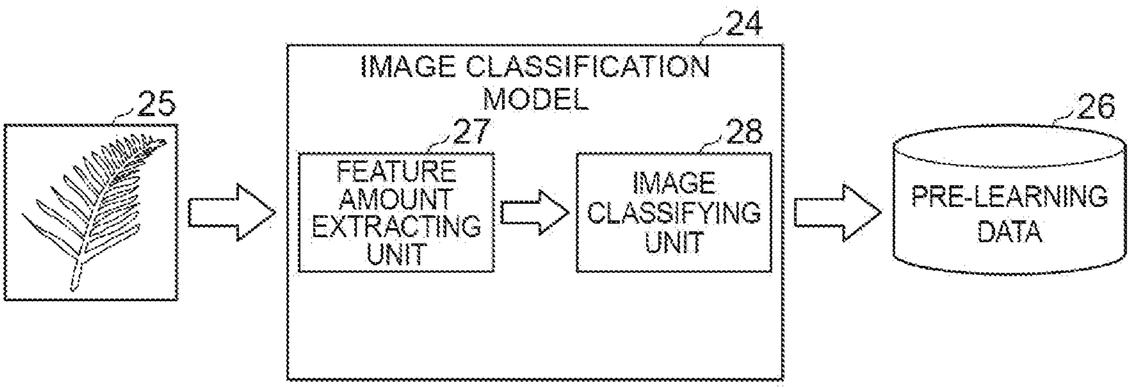
FIG. 5A is a block diagram illustrating a function of creating learned data illustrated in FIG. 4.
FIG. 5B is a block diagram illustrating a function of creating learned data illustrated in FIG. 4.

As illustrated in FIG. 5A, 5B, the learned data 21 is generated by pre-learning a formula driven database. The formula driven database is an image generated from a mathematical formula, and is data whose label does not need to be assigned to an image. As the formula driven database, for example, a data set (such as Fractal DB) including fractal geometric images is used.

More specifically, first, as illustrated in FIG. 5A, an image classification model 24 pre-learns a formula driven database 25 to create pre-learning data 26. Mathematical formula driven supervised learning is used as pre-learning of the formula driven database 25. The image classification model 24 includes a feature amount extracting unit 27 that extracts a feature amount of the formula driven database 25, and an image classifying unit 28 that solves an image classification problem of the feature amount of the formula driven database 25.

Furthermore, as illustrated in FIG. 5B, the transfer learning is performed using the pre-learning data 26, and the above loaded attitude recognition model 20 is constructed to create the learned data 21. At this time, the feature amount extracting unit 22 is caused to read the pre-learning data 26 obtained by pre-learning the formula driven database 25, and performs transfer learning on the data obtained by assigning the areas of the pallets 4 and the cargos 5 to a loaded attitude image 29 obtained by photographing the pallets 4 and the cargos 5 to acquire the learned data 21.

Returning to FIG. 1, the loaded attitude abnormality determining unit 16 determines whether or not the detection target pallet 4 interferes with the pallet 4 neighboring in the lateral direction based on the areas of the pallet 4 in the loaded attitude image data extracted by the area extracting unit 15. Furthermore, the loaded attitude abnormality determining unit 16 determines whether or not the detection target cargo 5 interferes with the cargo 5 or the pallet 4 neighboring in the lateral direction based on the areas of the pallets 4 and the cargos 5 in the loaded attitude image data extracted by the area extracting unit 15.

Figure 6:
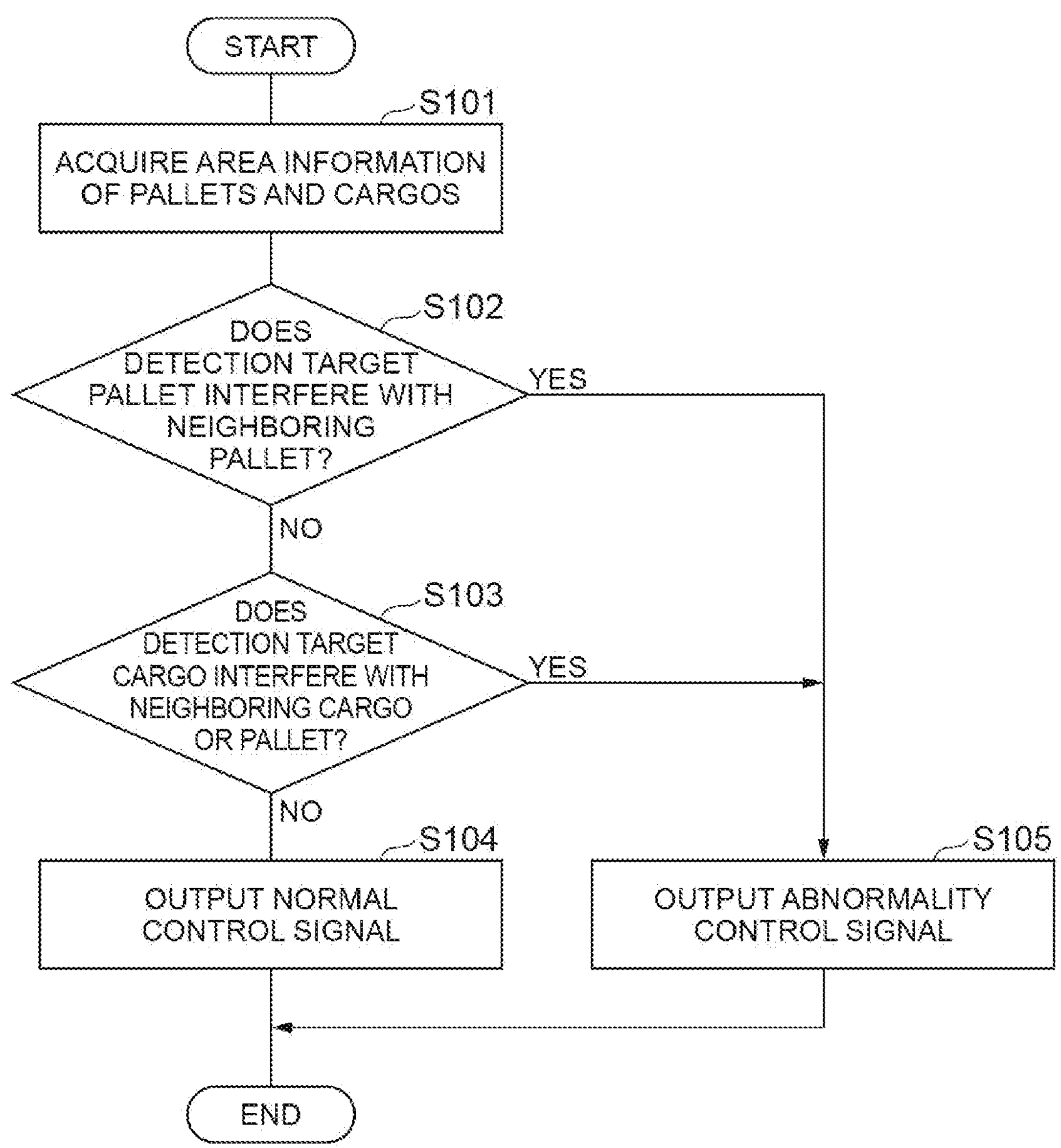
FIG. 6 is a flowchart illustrating a procedure of loaded attitude abnormality determination processing executed by a loaded attitude abnormality determining unit illustrated in FIG. 1.

FIG. 6 is a flowchart illustrating a procedure of loaded attitude abnormality determination processing executed by the loaded attitude abnormality determining unit 16. This processing is executed when, for example, a manual operation switch or the like instructs start of the load/unloading control.

In FIG. 6, the loaded attitude abnormality determining unit 16 first acquires area information of the pallets 4 and the cargos 5 in the loaded attitude image data extracted by the area extracting unit 15 (procedure S101). Subsequently, the loaded attitude abnormality determining unit 16 determines whether or not the detection target pallet 4 does not interfere with the pallet 4 neighboring in the lateral direction based on the area information of the pallets 4 in the loaded attitude image data (procedure S102). The detection target pallet 4 is the pallet 4 located neighboring to the loading/unloading target pallet 4 to be loaded and unloaded next.

When determining that the detection target pallet 4 does not interfere with the pallet 4 neighboring in the lateral direction, the loaded attitude abnormality determining unit 16 determines whether or not the detection target cargo 5 does not interfere with the cargo 5 or the pallet 4 neighboring in the lateral direction based on the areas of the pallet 4 and the cargo 5 in the loaded attitude image data (procedure S103). The detection target cargo 5 is the cargo 5 located neighboring to the loading/unloading target cargo 5 to be loaded and unloaded next. That is, the detection target cargo 5 is the cargo 5 placed on the pallet 4 located neighboring to the loading/unloading target pallet 4.

When determining that the detection target cargo 5 does not interfere with the cargo 5 or the pallet 4 neighboring in the lateral direction, the loaded attitude abnormality determining unit 16 outputs a normal control signal to the loading/unloading controlling unit 17 (procedure S104).

When determining in procedure S102 that the detection target pallet 4 interferes with the pallet 4 neighboring in the lateral direction, or determining in procedure S103 that the detection target cargo 5 interferes with the cargo 5 or the pallet 4 neighboring in the lateral direction, the loaded attitude abnormality determining unit 16 outputs an abnormality control signal to the loading/unloading controlling unit 17 (procedure S105).

Figure 7:
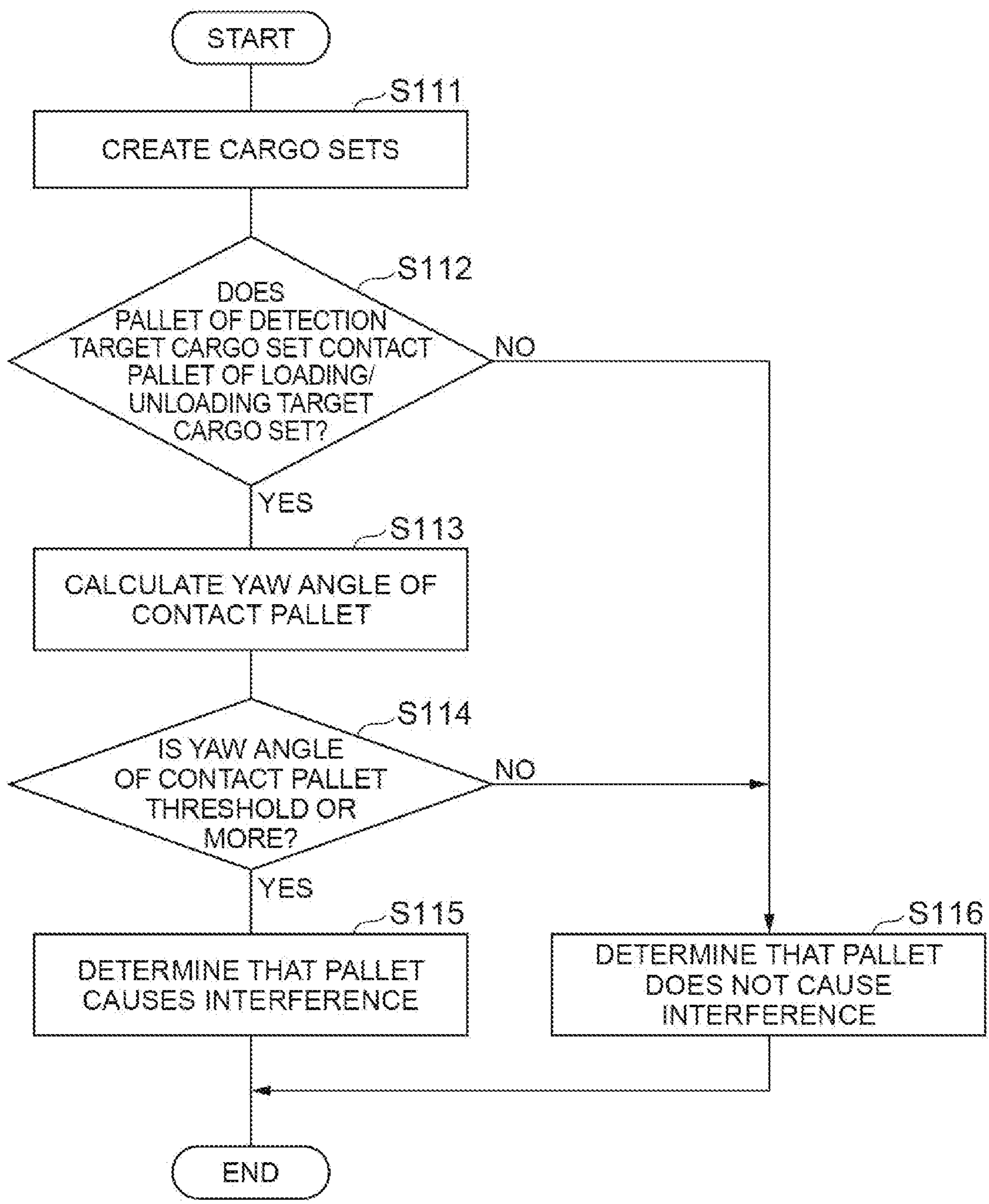
FIG. 7 is a flowchart illustrating details of procedure S102 illustrated in FIG. 6.
Figures 8A, 8B, 8C:
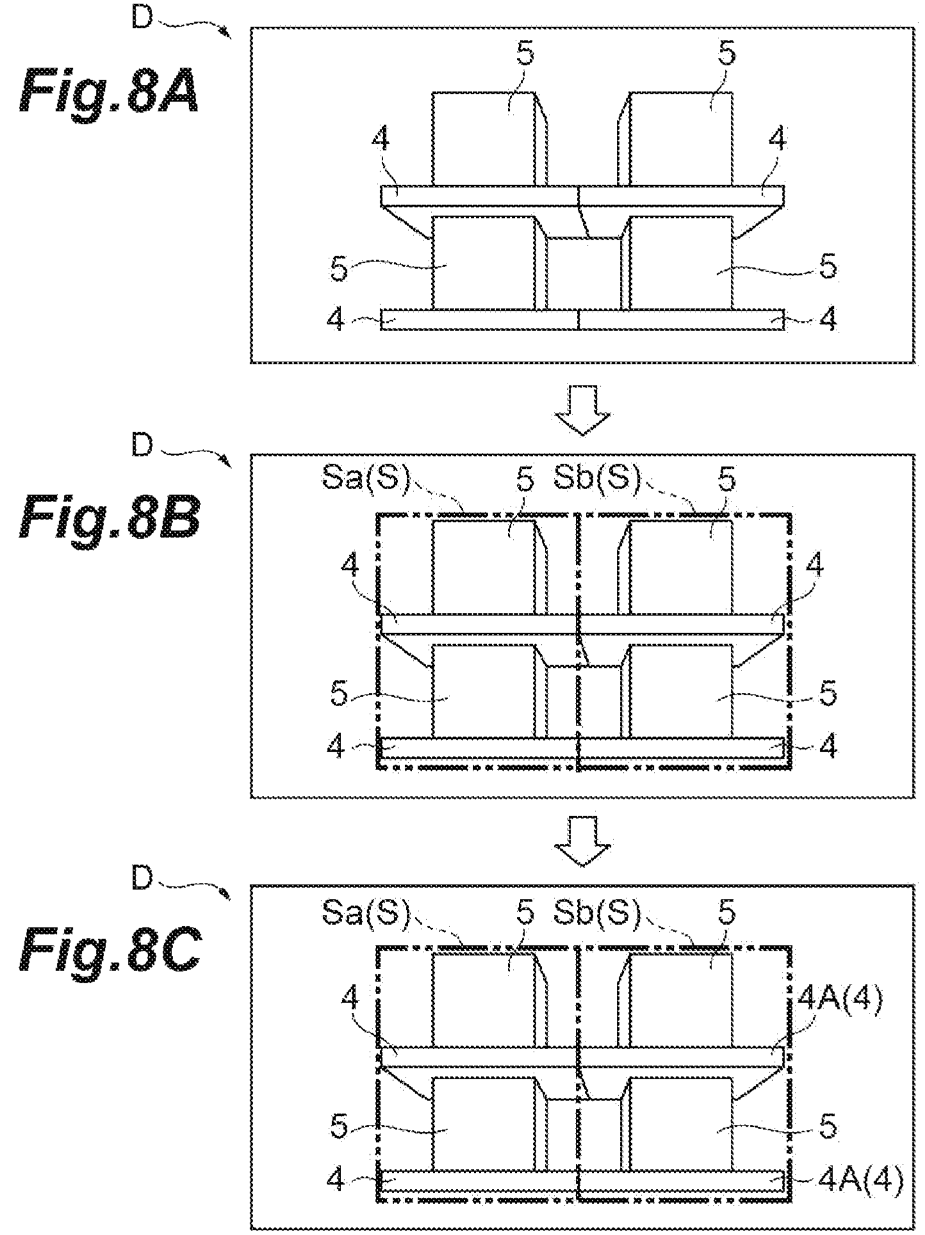
FIG. 8A is a view illustrating a state where the processing procedure illustrated in FIG. 7 determines whether or not a palette causes an interference.
FIG. 8B is a view illustrating a state where the processing procedure illustrated in FIG. 7 determines whether or not a palette causes an interference.
FIG. 8C is a view illustrating a state where the processing procedure illustrated in FIG. 7 determines whether or not a palette causes an interference.

FIG. 7 is a flowchart illustrating details of procedure S102 in FIG. 6. In FIG. 7, the loaded attitude abnormality determining unit 16 first creates a plurality of sets of cargo sets S in loaded attitude image data D (procedure S111). FIG. 8A illustrates an example of the loaded attitude image data D.

As illustrated in FIG. 8B, the cargo set S indicates a quadrangular area including the pallets 4 and the cargos 5 in contact with each other in an upper-lower direction in the loaded attitude image data D. That is, the cargo set S indicates the area including only the pallets 4 and the cargos 5 in contact with each other in the upper-lower direction in the loaded attitude image data D, and does not include the pallets 4 and the cargos 5 neighboring in the left-right direction (lateral direction). A plurality of sets of the cargo sets S are created along the lateral direction in the loaded attitude image data D. In FIG. 8B, two sets of cargo sets Sa and Sb neighboring in the lateral direction in the loaded attitude image data D are created. Furthermore, in FIG. 8B, the cargo set S includes the pallets 4 and the cargos 5 of the two upper and lower stages.

Subsequently, the loaded attitude abnormality determining unit 16 determines whether or not the pallet 4 of the detection target cargo set S among the plurality of sets of cargo sets S contacts the pallet 4 of the loading/unloading target cargo set S neighboring in the lateral direction (procedure S112). The loaded attitude abnormality determining unit 16 determines whether or not pixels of the pallet 4 of the detection target cargo set S contact pixels of the pallet 4 of the loading/unloading target cargo set S in the loaded attitude image data D, and thereby determines whether or not the pallet 4 of the detection target cargo set S contacts the pallet 4 of the loading/unloading target cargo set S. The loading/unloading target cargo set S is the cargo set S including the pallet 4 and the cargo 5 to be loaded and unloaded next.

In FIG. 8B, the cargo set Sa is the loading/unloading target cargo set S, and the cargo set Sb is the detection target cargo set S. Therefore, whether or not the pallet 4 of the detection target cargo set Sb contacts the pallet 4 of the loading/unloading target cargo set Sa is determined.

When determining that the pallet 4 of the detection target cargo set S contacts the pallet 4 of the loading/unloading target cargo set S neighboring in the lateral direction, the loaded attitude abnormality determining unit 16 calculates a yaw angle that is an attitude angle of the pallet 4 (hereinafter, referred to as a contact pallet 4A) of the detection target cargo set S based on the area information of the pallet 4 in the loaded attitude image data D and shape information of the pallet 4 that is known in advance (procedure S113).

In a state where the contact pallet 4A faces the front of the forklift 2, the yaw angle of the contact pallet 4A is 0 degree. In FIG. 8C, the pallet 4 of the detection target cargo set Sb is the contact pallet 4A in contact with the pallet 4 of the loading/unloading target cargo set Sa.

Furthermore, the loaded attitude abnormality determining unit 16 determines whether or not the yaw angle of the contact pallet 4A is a predetermined threshold or more (procedure S114). The threshold is set to an angle that does not influence an unloading operation of the pallet 4 and the cargo 5 of the loading/unloading target cargo set S even when the pallet 4 of the detection target cargo set S and the pallet 4 of the loading/unloading target cargo set S are in contact with each other, that is, to, for example, an angle that does not cause cargo collapse of the cargo 5.

When determining that the yaw angle of the contact pallet 4A is the threshold or more, the loaded attitude abnormality determining unit 16 determines that the pallet 4 of the detection target cargo set S interferes with the pallet 4 of the loading/unloading target cargo set S (procedure S115).

When determining in procedure S112 that the pallet 4 of the detection target cargo set S does not contact the pallet 4 of the loading/unloading target cargo set S neighboring in the lateral direction, or when determining in procedure S114 that the yaw angle of the contact pallet 4A is not the threshold or more, the loaded attitude abnormality determining unit 16 determines that the pallet 4 of the detection target cargo set S does not interfere with the pallet 4 of the loading/unloading target cargo set S (procedure S116).

Figure 9:
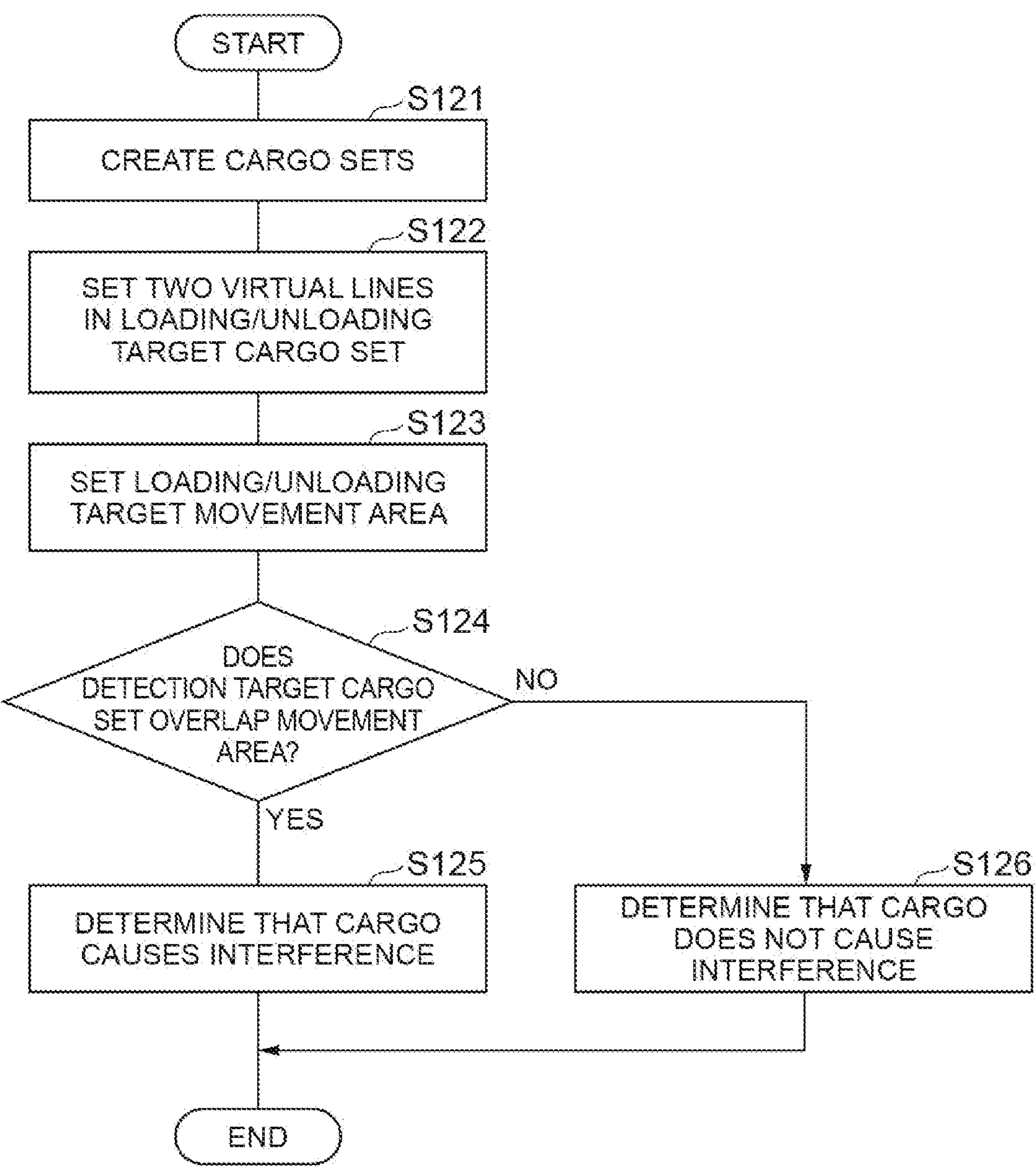
FIG. 9 is a flowchart illustrating details of procedure S103 illustrated in FIG. 6.
Figures 10A, 10B, 10C, 10D:
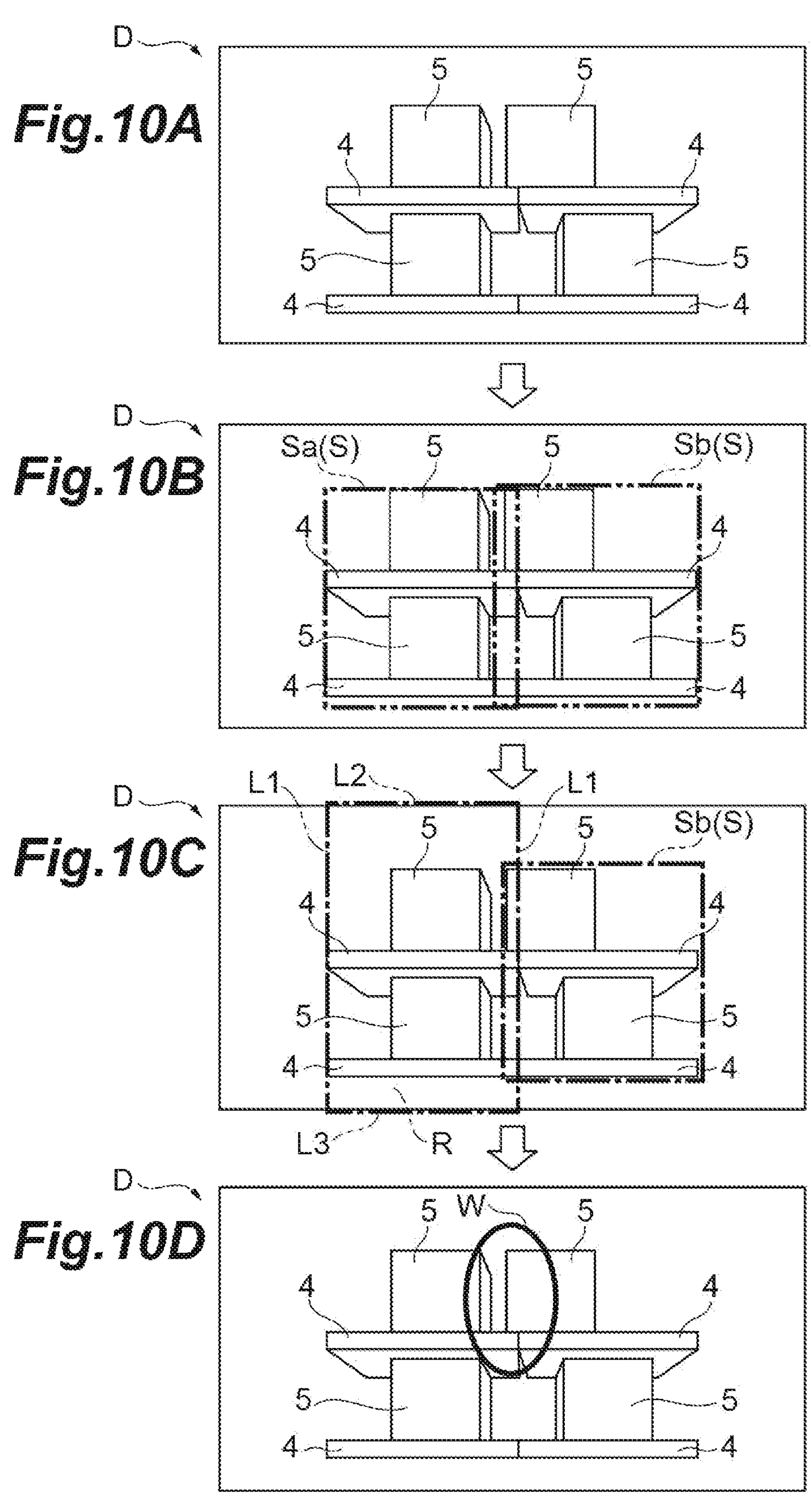
FIG. 10A is a view illustrating a state where the processing procedure illustrated in FIG. 9 determines whether or not a cargo causes an interference.
FIG. 10B is a view illustrating a state where the processing procedure illustrated in FIG. 9 determines whether or not a cargo causes an interference.
FIG. 10C is a view illustrating a state where the processing procedure illustrated in FIG. 9 determines whether or not a cargo causes an interference.
FIG. 10D is a view illustrating a state where the processing procedure illustrated in FIG. 9 determines whether or not a cargo causes an interference.

FIG. 9 is a flowchart illustrating details of procedure S103 in FIG. 6. In FIG. 9, the loaded attitude abnormality determining unit 16 first creates the plurality of sets of cargo sets S in the loaded attitude image data D (procedure S121). FIG. 10A illustrates another example of the loaded attitude image data D.

Similarly to above procedure S111, as illustrated in FIG. 10B, the cargo set S indicates a quadrangular area including the pallets 4 and the cargos 5 in contact with each other in the upper-lower direction in the loaded attitude image data D. In the loaded attitude image data D illustrated in FIG. 10B, two sets of the cargo sets Sa and Sb neighboring in the lateral direction are created.

Subsequently, the loaded attitude abnormality determining unit 16 sets, in the loaded attitude image data D, virtual lines L1 that are two vertical lines formed by extending in the upper-lower direction the both left and right ends of the pallet 4 of the loading/unloading target cargo set S (procedure S122). At this time, in a case where positions of the both left and right ends of the two upper and lower pallets 4 are shifted, the two virtual lines L1 formed by extending in the upper-lower direction the ends located outside the left-right direction among the both left and right ends of the two upper and lower pallets 4 are set. In the loaded attitude image data D illustrated in FIG. 10C, the two virtual lines L1 formed by extending in the upper-lower direction the both left and right ends of the pallet 4 of the loading/unloading target cargo set Sa are set.

Subsequently, the loaded attitude abnormality determining unit 16 sets a loading/unloading target movement area R in the loaded attitude image data D (procedure S123). As illustrated in FIG. 10C, the loading/unloading target movement area R is an area surrounded by the two virtual lines L1, a horizontal line L2 of an upper end of the loaded attitude image data D, and a horizontal line L3 of a lower end of the loaded attitude image data D in the loaded attitude image data D. The loading/unloading target movement area R corresponds to an inner area of the two virtual lines L1.

Subsequently, the loaded attitude abnormality determining unit 16 determines whether or not the detection target cargo set S overlaps the loading/unloading target movement area R (procedure S124). When determining that the detection target cargo set S overlaps the loading/unloading target movement area R, the loaded attitude abnormality determining unit 16 determines that the cargo 5 of the detection target cargo set S interferes with the cargo 5 or the pallet 4 of the loading/unloading target cargo set S (procedure S125).

In the loaded attitude image data D illustrated in FIG. 10C, part of the detection target cargo set Sb overlaps the loading/unloading target movement area R. Hence, as illustrated in FIG. 10D, it is determined that the cargo 5 of the detection target cargo set Sb interferes with the cargo 5 or the pallet 4 of the loading/unloading target cargo set Sa (see W in FIG. 10D).

When determining that the detection target cargo set S does not overlap the loading/unloading target movement area R, the loaded attitude abnormality determining unit 16 determines that the cargo 5 of the detection target cargo set S does not interfere with the cargo 5 or the pallet 4 of the loading/unloading target cargo set S (procedure S126).

Returning to FIG. 1, the loading/unloading controlling unit 17 controls the driving unit 12 and the warning unit 13 according to a determination result of the loaded attitude abnormality determining unit 16. When receiving an input of the normal control signal from the loaded attitude abnormality determining unit 16, the loading/unloading controlling unit 17 controls the driving unit 12 to unload a loading/unloading target. When receiving an input of an abnormality control signal from the loaded attitude abnormality determining unit 16, the loading/unloading controlling unit 17 controls the warning unit 13 to issue a warning.

As described above, when the forklift 2 performs unloading, the forklift 2 travels toward the truck 3. Furthermore, when the forklift 2 reaches the side of the truck 3, the forklift 2 temporarily stops. When the camera 11 images the loaded attitude state where the cargos 5 are placed on the plurality of pallets 4 in this state, the loaded attitude image data D of the pallets 4 and the cargos 5 is acquired.

Next, the areas of the pallets 4 and the cargos 5 in the loaded attitude image data D are extracted. Furthermore, whether or not the pallet 4 of the detection target cargo set S interferes with the pallet 4 of the loading/unloading target cargo set S neighboring in the lateral direction is determined based on the areas of the pallets 4 in the loaded attitude image data D. Furthermore, whether or not the cargo 5 of the detection target cargo set S interferes with the cargo 5 or the pallet 4 of the loading/unloading target cargo set S is determined based on the areas of the pallets 4 and the cargos 5 in the loaded attitude image data D.

When it is determined that the pallet 4 of the detection target cargo set S does not interfere with the pallet 4 of the loading/unloading target cargo set S, and when it is determined that the cargo 5 of the detection target cargo set S does not interfere with the cargo 5 or the pallet 4 of the loading/unloading target cargo set S, the driving unit 12 is controlled to unload the loading/unloading target cargo set S.

When it is determined that the pallet 4 of the detection target cargo set S interferes with the pallet 4 of the loading/unloading target cargo set S, the warning unit 13 issues a warning, and unloading of the detection target cargo set S is stopped. When it is determined that the cargo 5 of the detection target cargo set S interferes with the cargo 5 or the pallet 4 of the loading/unloading target cargo set S, the warning unit 13 also issues a warning, and unloading of the detection target cargo set S is stopped.

As described above, in the present embodiment, the areas of the pallets 4 and the cargos 5 are extracted in the loaded attitude image data D acquired by detecting the loaded attitudes of the pallets 4 and the cargos 5. Furthermore, whether or not the detection target pallet 4 interferes with the pallet 4 neighboring in the lateral direction is determined based on the areas of the pallets 4 in the loaded attitude image data D. Furthermore, whether or not the detection target cargo 5 interferes with the cargo 5 or the pallet 4 neighboring in the lateral direction is determined based on the areas of the pallets 4 and the cargos 5 in the loaded attitude image data D. When it is determined that the detection target pallet 4 interferes with the pallet 4 neighboring in the lateral direction, it is detected that the loaded attitude states of the pallets 4 and the cargos 5 are abnormal. When it is determined that the detection target cargo 5 interferes with the cargo 5 or the pallet 4 neighboring in the lateral direction, it is also detected that the loaded attitude states of the pallets 4 and the cargos 5 are abnormal. Consequently, it is possible to detect whether or not the loaded attitude states of the pallets 4 and the cargos 5 are abnormal. As a result, it is possible to achieve appropriate loading/unloading control matching the loaded attitude states of the pallets 4 and the cargos 5.

Furthermore, in the present embodiment, the plurality of sets of cargo sets S indicating the areas including the pallets 4 and the cargos 5 that are in contact with each other in the upper-lower direction in the loaded attitude image data D are created along the lateral direction, whether or not the pallet 4 of the detection target cargo set S among the plurality of sets of cargo sets S interferes with the pallet 4 of the cargo set S neighboring in the lateral direction is determined, and whether or not the cargo 5 of the detection target cargo set S interferes with the cargo 5 or the pallet 4 of the cargo set S neighboring in the lateral direction is determined. Hence, whether or not the detection target pallet 4 and cargo 5 cause interferences is determined per cargo set S indicating the area including the pallets 4 and the cargos 5 in contact with each other in the upper-lower direction in the loaded attitude image data D. The cargo set S corresponds to a unit of loading/unloading collectively performed by the forklift 2. Consequently, it is possible to efficiently determine whether or not the detection target pallet 4 and cargo 5 cause interferences in units of load/unloading.

Furthermore, in the present embodiment, when the pallet 4 of the detection target cargo set S contacts the pallet 4 of the cargo set S neighboring in the lateral direction, and the yaw angle of the pallet 4 of the detection target cargo set S is the threshold or more, it is determined that the pallet 4 of the detection target cargo set S interferes with the pallet 4 of the cargo set S neighboring in the lateral direction. Consequently, it is possible to easily determine whether or not the pallet 4 of the detection target cargo set S interferes with the pallet 4 of the cargo set S neighboring in the lateral direction.

Furthermore, even when the pallet 4 of the detection target cargo set S is in contact with the pallet 4 of the cargo set S neighboring in the lateral direction, and when the yaw angle of the pallet 4 of the detection target cargo set S is smaller than the threshold, it is possible to load and unload the cargo set S neighboring in the lateral direction of the detection target cargo set S without any trouble. Consequently, it is possible to prevent the loading/unloading work from being wastefully stopped.

Furthermore, in the present embodiment, when the detection target cargo set S overlaps the loading/unloading target movement area R surrounded by the two virtual lines L1 formed by extending in the upper-lower direction the both left and right ends of the pallet 4 of the cargo set S neighboring in the lateral direction, and the horizontal lines L2 and L3 of the upper and lower ends of the loaded attitude image data D, it is determined that the cargo 5 of the detection target cargo set S interferes with the cargo 5 or the pallet 4 of the cargo set S neighboring in the lateral direction. Consequently, it is possible to easily determine whether or not the cargo 5 of the detection target cargo set S interferes with the cargo 5 or the pallet 4 of the cargo set S neighboring in the lateral direction.

Furthermore, in the present embodiment, the loaded attitude image data D of the pallets 4 and the cargos 5 is acquired as the loaded attitude detection data by imaging the loaded attitudes of the pallet 4 and the cargo 5, and the areas of the pallets 4 and the cargos 5 in the loaded attitude image data D are extracted in units of pixels of the loaded attitude image data D. By using the loaded attitude image data D acquired by imaging the loaded attitudes of the pallets 4 and the cargos 5 in this way, it is possible to accurately extract the areas of the pallets 4 and the cargos 5 in the loaded attitude detection data.

Furthermore, in the present embodiment, using the learned data 21 including the loaded attitude images of a plurality of types of the pallets 4 and the cargos 5 and the pixel information of the plurality of types of the pallets 4 and the cargos 5, the areas of the pallets 4 and the cargos 5 in the loaded attitude image data D are extracted. By using the learned data 21 including the loaded attitude image and the pixel information in this way, it is possible to more accurately extract the areas of the pallets 4 and the cargos 5 in the loaded attitude image data D.

Furthermore, in the present embodiment, using the pre-learning data 26 obtained by pre-learning the formula driven database, the learned data 21 is generated by performing transfer learning on data obtained by annotating the pixel information of the pallets 4 and the cargos 5 to the loaded attitude images of the pallets 4 and the cargos 5. By using the pre-learning data 26 obtained by pre-learning the formula driven database in this way, it is possible to accurately extract the areas of the pallets 4 and the cargos 5 in the loaded attitude image data D while reducing the number of loaded attitude images obtained by imaging the loaded attitudes of the pallets 4 and the cargos 5.

Furthermore, in the present embodiment, by constructing the loaded attitude recognition model 20 by the instance segmentation model using deep learning, it is possible to more accurately extract the areas of the pallets 4 and the cargos 5 in the loaded attitude image data D.

The present disclosure is not limited to the above embodiment. For example, in the above embodiment, when the detection target cargo set S overlaps the loading/unloading target movement area R surrounded by the two virtual lines L1 formed by extending in the upper-lower direction the both left and right ends of the pallet 4 of the cargo set S neighboring in the lateral direction and the horizontal lines L2 and L3 of the upper and lower ends of the loaded attitude image data D, it is determined that the cargo 5 of the detection target cargo set S interferes with the cargo 5 or the pallet 4 of the cargo set S neighboring in the lateral direction. However, the present disclosure is not particularly limited to this embodiment. When, for example, the horizontal lines L2 and L3 of the upper and lower ends of the loaded attitude image data D are not used, and the detection target cargo set S overlaps the inner areas of the two virtual lines L1 formed by extending in the upper-lower direction the both left and right ends of the pallet 4 of the cargo set S neighboring in the lateral direction, it may be determined that the cargo 5 of the detection target cargo set S interferes with the cargo 5 or the pallet 4 of the cargo set S neighboring in the lateral direction.

Furthermore, in the above embodiment, the learned data 21 is created using the pre-learning data 26 obtained by pre-learning the formula driven database. However, the learned data 21 may be created by increasing the number of the loaded attitude images of the pallets 4 and the cargos 5 without using the pre-learning data 26 in particular.

Furthermore, in the above embodiment, the camera 11 acquires the loaded attitude image data D of the pallets 4 and the cargos 5 by imaging the loaded attitude state where the cargos 5 are loaded on the pallets 4. However, the present disclosure is not particularly limited to this embodiment. The loaded attitude detection data of the pallets 4 and the cargos 5 may be acquired by detecting the loaded attitude state where the cargos 5 are placed on the pallets 4 using a laser sensor or the like.

Furthermore, in the above embodiment, the forks of the forklift 2 hold together the pallets 4 of the two upper and lower stages on which the cargos 5 are placed. However, the present disclosure is not particularly limited to this embodiment. The forks of the forklift 2 may hold the one pallet 4 on which the cargo 5 is placed.

Furthermore, in the above embodiment, when the forklift 2 unloads the cargo 5 loaded on the bed 3*a* of the truck 3, the loaded attitude states of the pallet 4 and the cargo 5 is detected. However, the present disclosure is not particularly limited to the bed 3*a* of the truck 3, and is also applicable to, for example, a case where cargos are unloaded on a floor surface or the like in a factory.

What is claimed is:

1. A loaded attitude state detecting device configured to detect loaded attitude states of a plurality of pallets and cargos when a forklift performs loading/unloading in a state where the cargos are placed on the pallets aligned and disposed in a lateral direction seen from the forklift, the loaded attitude state detecting device comprising:

at least one processor and a memory storing a program executed by the one or more processors, wherein the processors are configured to:

acquire loaded attitude detection data of the pallets and the cargos by detecting loaded attitudes of the pallets and the cargos;

extract areas of the pallets and the cargos in the loaded attitude detection data;

determine whether or not a detection target pallet interferes with a pallet neighboring in the lateral direction based on the areas of the pallets in the loaded attitude detection data;

determine whether or not a detection target cargo interferes with a cargo or a pallet neighboring in the lateral direction based on the areas of the pallets and the cargos in the loaded attitude detection data;

create, along the lateral direction, a plurality of sets of cargo sets indicating areas including the pallets and the cargos that are in contact with each other in an upper-lower direction in the loaded attitude detection data;

determine whether or not a pallet of a detection target cargo set among the plurality of sets of cargo sets interferes with a pallet of a cargo set neighboring in the lateral direction; and determine whether or not a cargo of the detection target cargo set interferes with a cargo or a pallet of a cargo set neighboring in the lateral direction.

2. The loaded attitude state detecting device according to claim 1, wherein, when the pallet of the detection target cargo set contacts the pallet of the cargo set neighboring in the lateral direction, and an attitude angle of the pallet of the detection target cargo set is a predetermined threshold or more, the processors are configured to determine that the pallet of the detection target cargo set interferes with the pallet of the cargo set neighboring in the lateral direction.

3. The loaded attitude state detecting device according to claim 1, wherein, when the detection target cargo set overlaps an inner area of two virtual lines formed by extending, in the upper-lower direction, both left and right ends of a pallet of the cargo set neighboring in the lateral direction, the processors are configured to determine that the cargo of the detection target cargo set interferes with the cargo or the pallet of the cargo set neighboring in the lateral direction.

4. The loaded attitude state detecting device according to claim 1, wherein the processors are configured to:

acquire a loaded attitude image data of the pallets and the cargos as the loaded attitude detection data by imaging the loaded attitudes of the pallets and the cargos, and extract the areas of the pallets and the cargos in the loaded attitude image data in units of pixels of the loaded attitude image data.

5. The loaded attitude state detecting device according to claim 4, wherein the processors are configured to extract the areas of the pallets and the cargos in the loaded attitude image data by using learned data including loaded attitude images of a plurality of types of pallets and cargos and pixel information of the plurality of types of the pallets and the cargos.

6. The loaded attitude state detecting device according to claim 5, wherein the learned data is generated by performing transfer learning on data obtained by annotating the pixel information of the pallets and the cargos to the loaded attitude images of the pallets and the cargos, using pre-learning data obtained by pre-learning a formula driven database.

* * * * *